US008401006B2

(12) United States Patent
Johnson et al.

(10) Patent No.: US 8,401,006 B2
(45) Date of Patent: Mar. 19, 2013

(54) METHOD AND SYSTEM FOR ENFORCING TRAFFIC POLICIES AT A POLICY ENFORCEMENT POINT IN A WIRELESS COMMUNICATIONS NETWORK

(75) Inventors: Drew Johnson, San Carlos, CA (US); Marcelo C. San Martin, Alviso, CA (US); Matt Halligan, Enniskillen (GB); Shaun McGinnity, Belfast (IE)

(73) Assignee: Unwired Planet, Inc., Redwood City, CA (US)

( * ) Notice: Subject to any disclaimer, the term of this patent is extended or adjusted under 35 U.S.C. 154(b) by 294 days.

(21) Appl. No.: 12/859,471

(22) Filed: Aug. 19, 2010

(65) Prior Publication Data
US 2012/0044807 A1 Feb. 23, 2012

(51) Int. Cl.
*G01R 31/08* (2006.01)
(52) U.S. Cl. ....................................... 370/353
(58) Field of Classification Search ........................ None
See application file for complete search history.

(56) References Cited

U.S. PATENT DOCUMENTS

| 7,246,165 | B2 | 7/2007 | Williams et al. | |
|---|---|---|---|---|
| 2005/0038887 | A1* | 2/2005 | Cuervo et al. | 709/224 |
| 2005/0091409 | A1* | 4/2005 | Williams et al. | 709/247 |
| 2007/0050842 | A1* | 3/2007 | Smith et al. | 726/12 |
| 2008/0225708 | A1 | 9/2008 | Lange | |
| 2008/0225712 | A1* | 9/2008 | Lange | 370/230.1 |
| 2010/0146037 | A1 | 6/2010 | Little | |
| 2011/0289226 | A1* | 11/2011 | Williams et al. | 709/228 |

OTHER PUBLICATIONS

Salvatore Iacono, Fabrizio Arneodo, Policy Based Management for Next Generation Mobile Networks, 2003, pp. 1350-1354, Motorola Technology Center of Italy, Torino, Italy.

Thor Gunnar Eskedal, Frederic Paint, Quality of Service in UMTS, Telektronikk 2/3, 2001, p. 332-345.
Pertuu Kivimaki, Policy Based Networks & Bandwidth Broker; Terminology & TUT's Implementation, Tampere University of Technology, Aug. 2000, p. 1-5.
M. Stasiak J. Wiewiora, P. Zwierzykowski, Modeling and Dimensioning of the IUB Interface in the UMTS Network, Ubiquitous Computing and Communication Journal, 2008, p. 1-7.
R. Ferrus, A. Gelonch, O. Sallent, J. Perez-Romero, N. Nafisi, M. Dohler, A Feasible Approach for QoS Management in Coordinated Heterogeneous Radio Access Networks, p. 1-8.
F. Casadevali, P. Emmanuelsson, R. Ferrus, A. Gelonch, P.C. Karlsson, N. Nafisi, J. Perez Romero, O. Sallent, L. Wang, A Policy Based QoS Architecture for Heterogeneous Wireless Systems, p. 1-8.
Kun Yang and Yumin Wu, Yang Yang, Enjie Liu, Policy-based service-driven dynamic planning of heterogeneous wireless networks, Int. J. Mobile Network Design and Innovation, vol. 2, No. 1, 2007, p. 67-77.
Rajiv Chakravorty, Maurizio D'Arienzo, Ian Pratt, Jon Crowcroft, A Framework for Dynamic SLA-based QoS Control for UMTS, p. 1-11.
Yathiraj B. Udupi, Munindar P. Singh, Multiagent Policy Architecture for Virtual Business Organizations, p. 1-8.
R. Yavatkar, D. Pendarakis, R. Guerin, RFC2753—A Framework for Policy-based Admission Control, Jan. 2000.

(Continued)

*Primary Examiner* — Fan Ng

(57) ABSTRACT

Embodiments of a method and system for enforcing a traffic policy at a Policy Enforcement Point (PEP) that controls the flow of traffic in a wireless communications network are described. In one embodiment, a method involves learning the topology of the wireless communications network, defining a virtual PEP (VPEP) within the topology of the wireless communications network, the VPEP comprising a location component that is remote from the PEP, associating a traffic policy with the VPEP, associating a traffic flow with the VPEP if the traffic flow has a characteristic that corresponds to the location component of the VPEP, and enforcing, at the PEP, the traffic policy that is associated with the VPEP against the traffic flow.

17 Claims, 5 Drawing Sheets

OTHER PUBLICATIONS

R. Ferrus, A. Gelonch, O. Sallent, J. Perez-Romero, N. Nafisi, M. Dohler, A Feasible Approach for QoS Management in Coordinated Heterogeneous Radio Access Networks, pp. 607-614; Apr. 7-9, 2005.

F. Casadevali, P. Emmanuelsson, R. Ferrus, A. Gelonch, P.C. Karlsson, N. Nafisi, J. Perez-Romero, O. Sallent, L. Wang, "A Policy Based QoS Architecture for Heterogeneous Wireless Systems", p. 1-8; Apr. 6-7, 2005.

Rajiv Chakravorty, Maurizio D'Arienzo, Ian Pratt, Jon Crowcroft, "A Framework for Dynamic SLA-based QoS Control for UMTS", vol. 10, Issue 5; p. 30-37; Oct. 2003.

Yathiraj B. Udupi, Munindar P. Singh, "Multiagent Policy Architecture for Virtual Business Organizations"; p. 1-8; Sep. 18-22, 2006.

* cited by examiner

| VPEP Name | Location Component | Traffic Policy |
|---|---|---|
| VPEP1.1 | Iub1.1 | 10 Mb/s |
| VPEP1.2 | Iub1.2 | 50 Mb/s |
| VPEP1.3 | Iub1.3 | 25 Mb/s 10pm-8am<br>15 Mb/s 8am-10pm |
| VPEP1.4 | Iub1.4 | 10 Mb/s |
| VPEP2.1 | Iub2.1 | 100 Mb/s |
| VPEP2.2 | Iub2.2 | 10 Mb/s |
| VPEP2.3 | Iub2.3 | 25 Mb/s |
| VPEP2.4 | Iub2.4 | 10 Mb/s |

FIG.2

METHOD AND SYSTEM FOR ENFORCING TRAFFIC POLICIES AT A POLICY ENFORCEMENT POINT IN A WIRELESS COMMUNICATIONS NETWORK

BACKGROUND

Traditional bandwidth management systems require the installation of physical network element, called Policy Enforcement Point (PEP), in the traffic path. A PEP is a network device, often implemented in a network router, which is capable of locally shaping traffic (enforcing traffic policies/rules) as instructed by a Policy Decision Point (PDP). The installation of multiple PEPs in a large and complex network, such as a wireless communications network with several thousand links and network elements, is a costly and complex task.

SUMMARY

In accordance with an embodiment of the invention, virtual PEPs are defined by the PDP to control the flow of traffic at specific points within a wireless communications network. A virtual PEP (VPEP) includes a location component that identifies a location within the wireless communications network that is remote from the PEP. In an embodiment, the location component of a VPEP is at least one of the interfaces in the wireless communications network. Although each VPEP includes a location component that is remote from the PEP, the actual enforcement of traffic policies occurs at the PEP, i.e., the physical device in which the PEP is implemented. In particular, traffic that enters the PEP is evaluated to determine if the traffic is destined for a VPEP and if so, any corresponding traffic policies are enforced at the PEP itself. Because the VPEPs include a location component, traffic policies can be enforced at various remote locations in the wireless communications network without having to install a PEP at each remote location. That is, traffic policies are enforced at the VPEP locations without having to install a physical device at each VPEP location. The VPEPs thereby enable interface-specific policy enforcement throughout a VPEP domain using only a single physical PEP device.

Embodiments of a method are also described. In one embodiment, a method for enforcing a traffic policy at a PEP that controls the flow of traffic in a wireless communications network is described. The method involves learning the topology of the wireless communications network, defining a VPEP within the topology of the wireless communications network, the VPEP comprising a location component that is remote from the PEP, associating a traffic policy with the VPEP, associating a traffic flow with the VPEP if the traffic flow has a characteristic that corresponds to the location component of the VPEP, and enforcing, at the PEP, the traffic policy that is associated with the VPEP against the traffic flow.

Embodiments of a system are also described. In one embodiment, a system for enforcing a traffic policy in a wireless communications network is described. The system includes a policy decision point (PDP) for establishing traffic policies and a policy enforcement point (PEP) for enforcing the traffic policies of the PDP. The PDP includes a VPEP engine and a policy manager. The VPEP engine is configured to learn the topology of the wireless communication network and define a VPEP within the topology of the wireless communication network, the VPEP comprising a location component that is remote from the PEP. The policy manager that is configured to associate a traffic policy with the VPEP and associate a traffic flow with the VPEP if the traffic flow has a characteristic that corresponds to the location component of the VPEP. Additionally, the PEP includes a policy enforcement engine that is configured to enforce the traffic policy that is associated with the VPEP on the traffic flow.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2 is a table of traffic policies that are associated with the VPEPs of FIG. 1.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
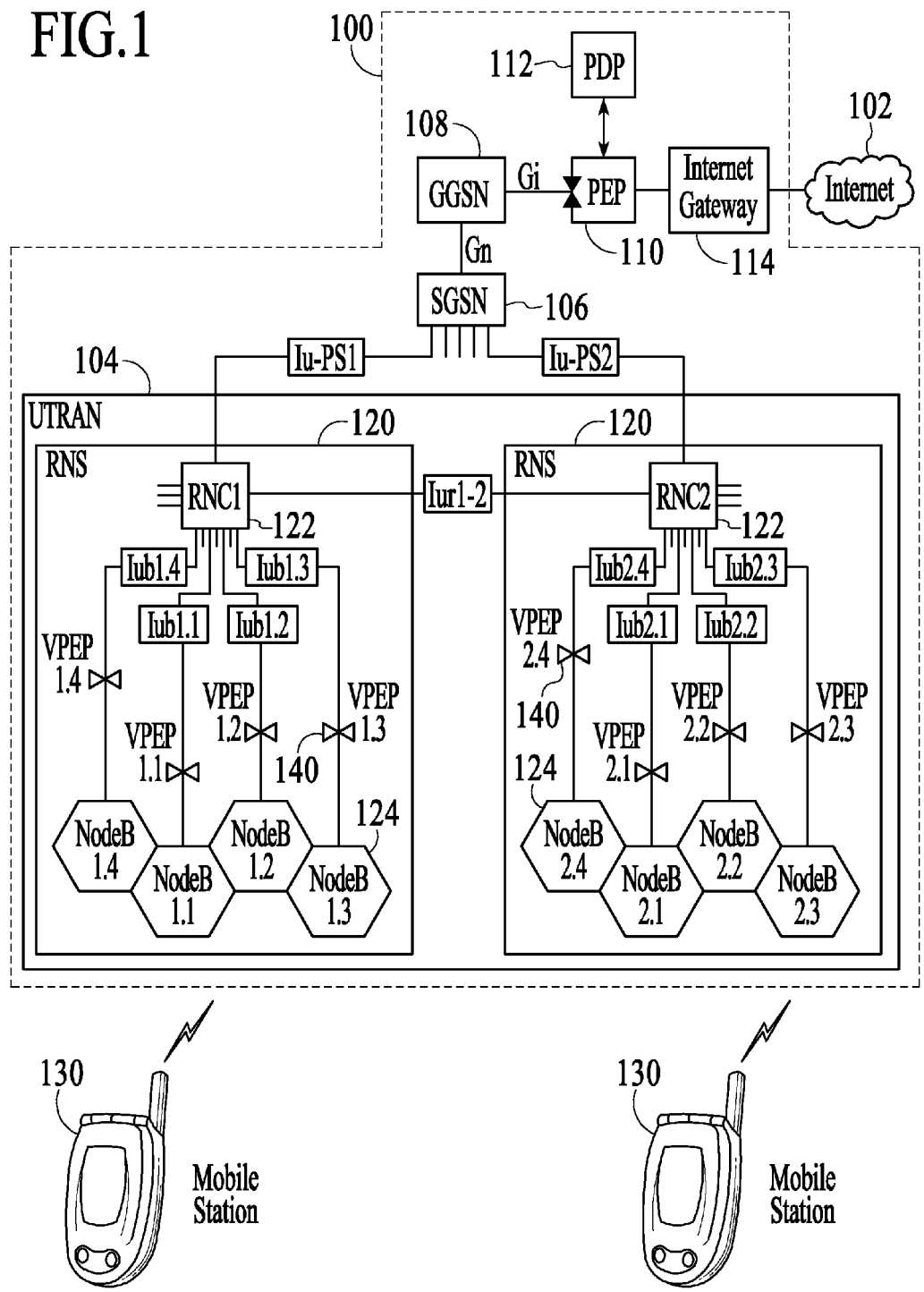
FIG. 1 depicts a schematic block diagram of one embodiment of a wireless communications network that includes virtual Policy Enforcement Points (VPEPs).

FIG. 1 depicts a schematic block diagram of one embodiment of a wireless communications network 100 that is connected to the Internet 102. The wireless communications network depicted in FIG. 1 includes a Universal Terrestrial Radio Access Network (UTRAN) 104, a Serving General Packet Radio Service (GPRS) Support Node (SGSN) 106, a Gateway GPRS Support Node (GGSN) 108, a Policy Enforcement Point (PEP) 110, a Policy Decision Point (PDP) 112, and an Internet gateway 114. The architecture of the UTRAN depicted in FIG. 1 is defined by the $3^{rd}$ Generation Partnership Project (3GPP) and includes Radio Network Subsystems (RNSs) 120, with each RNS including a Radio Network Controller (RNC) 122 and multiple NodeBs 124. The wireless communications network provides wireless communications infrastructure for mobile stations 130 (also referred to as User Equipment (UE)).

The mobile stations 130 are typically handheld wireless devices, such as cell phones, mobile phones, smartphones, Personal Digital Assistants (PDA), handheld gaming devices, laptop computers, pad computers etc, that can wirelessly communicate using radio frequency (RF) communications signals. The mobile stations can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3GPP or the $3^{rd}$ Generation Partnership Project 2 (3GPP2), 4G Long Term Evolution (LTE) and IEEE 802.16 standards bodies. Although some wireless communications protocols are identified herein, it should be understood that present disclosure is not limited to the cited wireless communications protocols.

In the embodiment of FIG. 1, the UTRAN 104 facilitates radio communications between the mobile stations 130 and a core network that includes the SGSN 106, the GGSN 108, and the Internet gateway 114. In an embodiment, the UTRAN includes one or more base stations (NodeBs) 124 to facilitate communications between the mobile stations 130 that are within a communication range of the base stations. The UTRAN facilitates network communications among multiple mobile stations within the same radio access network and between mobile stations in other radio access networks and provides interfaces to facilitate communications with other entities, such as a Public Switched Telephone Network (PSTN), a Wide Area Network (WAN), the Internet, Internet servers, hosts, etc., which are outside of the wireless communications network. In an embodiment, the wireless communications network depicted in FIG. 1 is operated by a wireless service provider.

Data signals communicated between the mobile stations 130 and the UTRAN 104 include, but are not limited to, analog and/or digital RF signals (i.e., radio waves) for any type of communication mode, including text messaging, multimedia messaging, voice calling, and Internet browsing. The UTRAN 104 can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that present disclosure is not limited to the cited wireless communications protocols.

Each of the NodeBs 124 depicted in FIG. 1 is a network element that performs base station functionality. In an embodiment, the NodeBs use Wideband Code Division Multiple Access (WCDMA)/Time Division Synchronous Code Division Multiple Access (TD-SCDMA) to communicate with the mobile stations. In an embodiment, each NodeB includes an RF transceiver that communicates with the mobile stations that are within a service area of the NodeB. In one embodiment, the NodeBs have a minimum amount of functionality and are controlled by an RNC 122. In another embodiment in which High Speed Downlink Packet Access (HSDPA) is used, some logic (e.g. retransmission) is handled by the NodeB to achieve shorter response times.

Each RNC 122 is a network element that controls the connected NodeBs 124. In particular, the RNCs are responsible for radio resource management and mobility management. The RNCs are also the elements that perform encryption before user data is sent to and from a mobile station. In an embodiment, radio resource management operations include outter loop power control, load control, admission control, packet scheduling, handover control, security functions, and mobility management. The RNCs may also implement various radio resource optimization operations.

The SGSN 106 is a network element that delivers packets to and from the mobile stations 130 within a corresponding geographical service area. Functionality of the SGSN includes packet routing and transfer, mobility management (e.g., attach/detach and location management), logical link management, and authentication and billing. In an embodiment, the SGSN maintains a location register that stores location information, such as the current cell of a mobile station, and user profiles, such as the International Mobile Subscriber Identity (IMSI) address used in the packet data network, of all GPRS mobile stations that are registered within the corresponding geographical service area of the SGSN.

The GGSN 108 is a network element that provides interworking between the GPRS network and external packet switched networks, such as the Internet and X.25 networks. In particular, the GGSN hides the GPRS infrastructure from the external networks. Some functionality of the GGSN includes checking to see if specific mobile stations are active in the radio access network and forwarding data packets to the SGSN 106 that is currently supporting a mobile station. The GGSN also converts GPRS packets coming from an SGSN into the needed packet data protocol format (e.g., Internet Protocol or X.25) and forwards packets to the appropriate external network. The GGSN is also responsible for IP address management/assignment and is the default router for the mobile stations. The GGSN may also implement Authentication, Authorization, and Accounting (AAA) and billing functions.

3GPP networks that include NodeBs 124, RNCs 122, SGSNs 106, and GGSNs 108 are well-known in the field and all of the particular functionality of each functional element is not described in further detail herein.

The Internet gateway 114 provides a gateway for communications between the mobile stations 130 and Internet-connected hosts and/or servers. For example, the Internet gateway can be a Wireless Application Protocol (WAP) gateway that converts the WAP protocol used by the UTRAN to the Hypertext Transfer Protocol (HTTP) protocol used by the Internet. In an embodiment, the Internet gateway enables mobile stations to access multimedia content, such as Hyper Text Markup Language (HTML), compact HTML (cHTML), and extensible HTML (xHTML), which is stored on Internet-connected hosts and/or servers.

In a UMTS network architecture as defined by the 3GPP, the interfaces between each network element have been identified with a name. As depicted in FIG. 1, the interface between a NodeB 124 and an RNC 122 is identified as "Iub," the interface between the RNCs 122 is identified as "Iur," the interface between the RNCs 122 and the SGSN 106 is identified as "Iu-PS," the interface between the SGSN 106 and the GGSN 108 is identified as "Gn," and the interface between the GGSN 108 and the Internet Gateway 114 is identified as "Gi." In the embodiment of FIG. 1, where multiple similar interfaces exist, the interfaces are uniquely identified by a reference number, e.g., Iu-PS1, Iu-PS2, Iub1.1, Iub1.2, Iub2.1, Iub2.2, etc.

Although the UTRAN 104 depicted in FIG. 1 includes two RNSs 120 with four NodeBs 124 each, it should be understood that the wireless communications network can include more than the depicted number of such elements. Additionally, the wireless communications network can support a large number of mobile stations as is known in the field.

The PDP 112 functions to determine what traffic policies to apply to the network traffic. Traffic policies may include, for example, volume-based policies, time-based policies, application-based policies, and access-control based policies. For example, volume-based traffic polices may be managed per device type, for example, feature phone, smartphone, netbook, laptop, pad computer; per time of day, for example, 1 Gb per month quota for peak times, 10 Gb per month quota for off peak times; per URL or application; per subscriber or group of subscribers; per recurring time period, for example, 1 Gb per month quota; per traffic type, i.e., messaging, web browsing, video; per network access type, including 3G, 4G, Wi-Fi, home vs. roaming network. A time-based traffic policy may limit access to a certain period of time, e.g., pre-paid access of a limited number of minutes. An application-based traffic policy may allow free access to an application for a period of time or until the subscriber has exceeded a pre-defined page view quota or allow the subscriber to execute a policy-defined number of downloads from the application. For example, a subscriber might be entitled to five music or video downloads from a given application as per policy rules. The PDP translates the traffic policies into a format that can be understood by the PEP 110. In an embodiment, the PDP provides the PEP with a Policy Information Base (PIB) to communicate policy information. In an embodiment, the PDP makes policy decisions based on policy information and rules that are stored in a policy repository.

The PEP 110 is implemented in a physical device, such as a router or gateway, which is located in the data plane/path of the network traffic. The PEP functions to enforce the policy decisions that are made by the PDP 112 and communicated to the PEP. The PEP provides the link between the external representation of the policy (i.e., the PIB) and the internal configuration of the physical device and the PEP shapes traffic at the exit points of the physical device. Examples of policy enforcement actions include, allowing data to be transmitted to the intended destination, preventing data from being transmitted to the intended destination, preventing data from being transmitted to the intended destination and rerouting the data to a service provider-defined end point that presents the subscriber with some options, and/or throttling or reducing bandwidth throughput. In an embodiment, the PEP is implemented on a central processing unit (CPU) based blade server that utilizes the LINUX or SOLARIS operating system although other implementations are possible.

An example of standardized communications between the PDP and the PEP is described in the document "A framework for Policy-based Admission Control," R. Yavatkar et al., RFC2753, January 2000.

In accordance with an embodiment of the invention, virtual PEPs are defined by the PDP to control the flow of traffic at specific points within the wireless communications network. A virtual PEP (VPEP) includes a location component that identifies a location within the wireless communications network that is remote from the PEP. In an embodiment, the location component of a VPEP is at least one of the interfaces in the wireless communications network. For example, FIG. 1 depicts multiple VPEPs 140 that have been established to enforce traffic policies at various locations within the wireless communications network. Each of the VPEPs is remote from the PEP in that the VPEPs correspond to locations in the wireless communications network that cross at least one interface or that are not in the same physical device as the PEP. FIG. 1 depicts the following VPEPs:

VPEP 1.1 at interface Iub 1.1;
VPEP 1.2 at interface Iub 1.2;
VPEP 1.3 at interface Iub 1.3;
VPEP 1.4 at interface Iub 1.4;
VPEP 2.1 at interface Iub 2.1;
VPEP 2.2 at interface Iub 2.2;
VPEP 2.3 at interface Iub 2.3; and
VPEP 2.4 at interface Iub 2.4.

Although each VPEP 140 includes a location component that is remote from the PEP 110, the actual enforcement of traffic policies occurs at the PEP, i.e., the physical device in which the PEP is implemented. In particular, traffic that enters the PEP is evaluated to determine if the traffic is destined for a VPEP and if so, any corresponding traffic policies are enforced at the PEP itself. Although the VPEPs are depicted in certain locations in FIG. 1, the VPEPs represent virtual entities that do not physically exist at the depicted locations. However, because the VPEPs include a location component, traffic policies can be enforced at various remote locations in the wireless communications network without having to install a PEP at each remote location. That is, traffic policies are enforced at the identified VPEP locations without having to install a physical device at each VPEP location. The VPEPs thereby enable interface-specific policy enforcement throughout the wireless communications network using only a single physical PEP device.

In order to implement the VPEPs 140, the PEP 110 must be located high enough in the network hierarchy that the PEP sees all of the traffic that will eventually pass through the corresponding VPEPs. In the embodiment of FIG. 1, all traffic that is downloaded from the Internet 102 to the mobile stations 130 must pass through the PEP and therefore, the downloaded traffic can be controlled by the PEP before the traffic reaches the NodeBs 124. In general, a PEP can be implemented at any point in the network in which aggregated traffic can be examined and controlled and the location of the PEP in the wireless communications network effectively defines the bounds of a "VPEP domain," within which VPEPs can be implemented.

FIG. 2 is a table 200 of traffic policies that are associated with the VPEPs of FIG. 1. In particular, the left column of the table identifies the VPEP name, the center column identifies the location component of the VPEP (e.g., the interface name), and the right column identifies a traffic policy that is associated with the VPEP. Although only a single location component is associated with each VPEP, more than one location component can be associated with a VPEP. Likewise, more than one traffic policy can be associated with a VPEP.

Referring back to FIG. 1, in operation, the PDP 112 learns the topology of the wireless communications network 100. Various known techniques can be used to learn the network topology. VPEPs 140 are then established through, for example, an application programming interface (API). Traffic policies are then associated with the VPEPs through, for example, an API. Examples of traffic policies include a volume-based traffic policy, e.g., 10 Mb/s. Other policies may include device (i.e., mobile station)-specific bandwidth limitations, user/subscriber-specific bandwidth limitations, and/or application-specific bandwidth limitations. Still other traffic policies may include temporal-based policies (e.g., month, week, day, time), traffic polices based on subscription level, event-based traffic polices, or any other criteria that can be used to make a policy decision.

A traffic flow that is received at the PEP 110 from the Internet 102 is then examined to determine if the traffic flow is associated with any of the VPEPs. For example, the source and/or destination IP address of the traffic flow is examined to determine if the traffic flow will pass through the interface of a VPEP. In an embodiment, an IP address of a mobile station is used to find a Cell ID that is servicing the mobile station. Once the Cell ID is known, VPEPs that correspond to the Cell ID can be determined, i.e., VPEPs through which the traffic must pass to reach the mobile station. If a traffic flow corresponds to a VPEP (i.e., the traffic flow will eventually pass through an interface that corresponds to the VPEP), the traffic policy associated with the VPEP is enforced on the traffic flow. In some embodiments, the traffic policy is enforced as a function of current traffic conditions, which can be obtained by network monitoring/sensing and/or calculation. For example, if the traffic policy allows 10 Mb/s of traffic on the interface and current traffic conditions indicate a flow of 5 Mb/s, enforcement of the traffic policy will allow another 5 Mb/s of traffic to pass through the interface.

Figure 3:
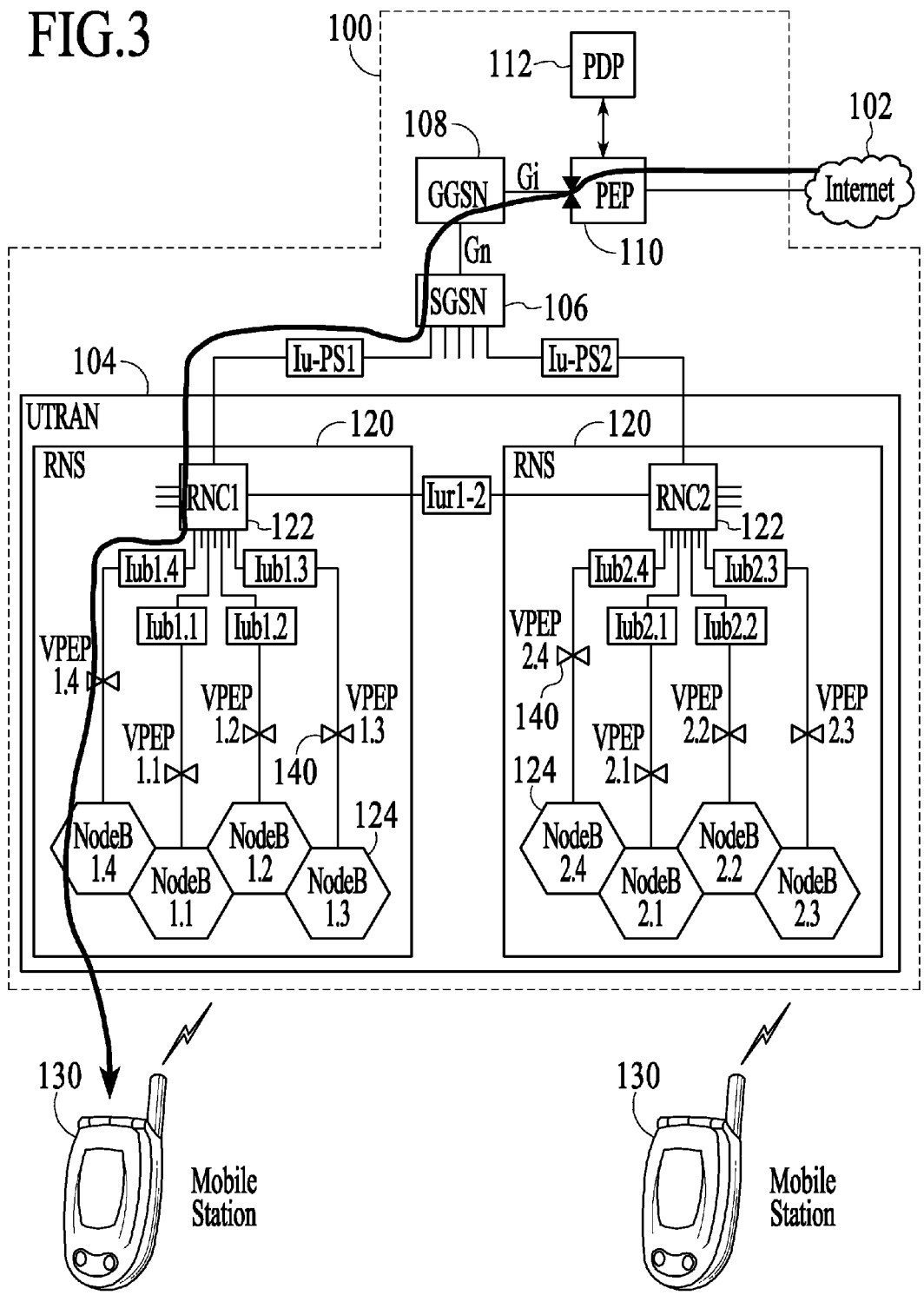
FIG. 3 illustrates a traffic flow, such as IP-based web traffic, that travels from the Internet to the mobile station via NodeB1.4.

FIG. 3 illustrates a traffic flow 150, such as IP-based web traffic, that travels from the Internet 102 to the mobile station 130 via NodeB1.4 124. The traffic is associated with VPEP1.4 because the traffic passes through interface Iub1.4 on its way to the mobile station. In accordance with an embodiment of the invention, the PDP 112 associates the traffic flow with VPEP1.4 and the traffic policy of 10 Mb/s is enforced against the traffic flow. In an embodiment, enforcement of the traffic policy involves obtaining the current traffic conditions at Iub1.4 (e.g., in Mb/s) and comparing the current traffic conditions to the traffic policy to determine if the traffic flow can pass through Iub 1.4 via the PEP. If the current traffic conditions at Iub 1.4 are within the traffic policy, then the traffic flow is allowed to pass through the PEP and to the mobile station. However, if the current conditions at Iub1.4 exceed the traffic policy, then the traffic flow may be held, dropped, or throttled in some way so as to meet the traffic policy at Iub1.4.

It should be noted that other traffic policies may be applied to the same traffic flow in addition to the traffic policy associated with the VPEP. For example, the traffic flow 150 of a specific subscriber may be subject to a subscriber-specific traffic policy (e.g., no more than 25 Mb of download per month) as well as the traffic policy associated with the VPEP (e.g., VPEP1.4—10 Mb/s through interface Iub1.4).

Figure 4:
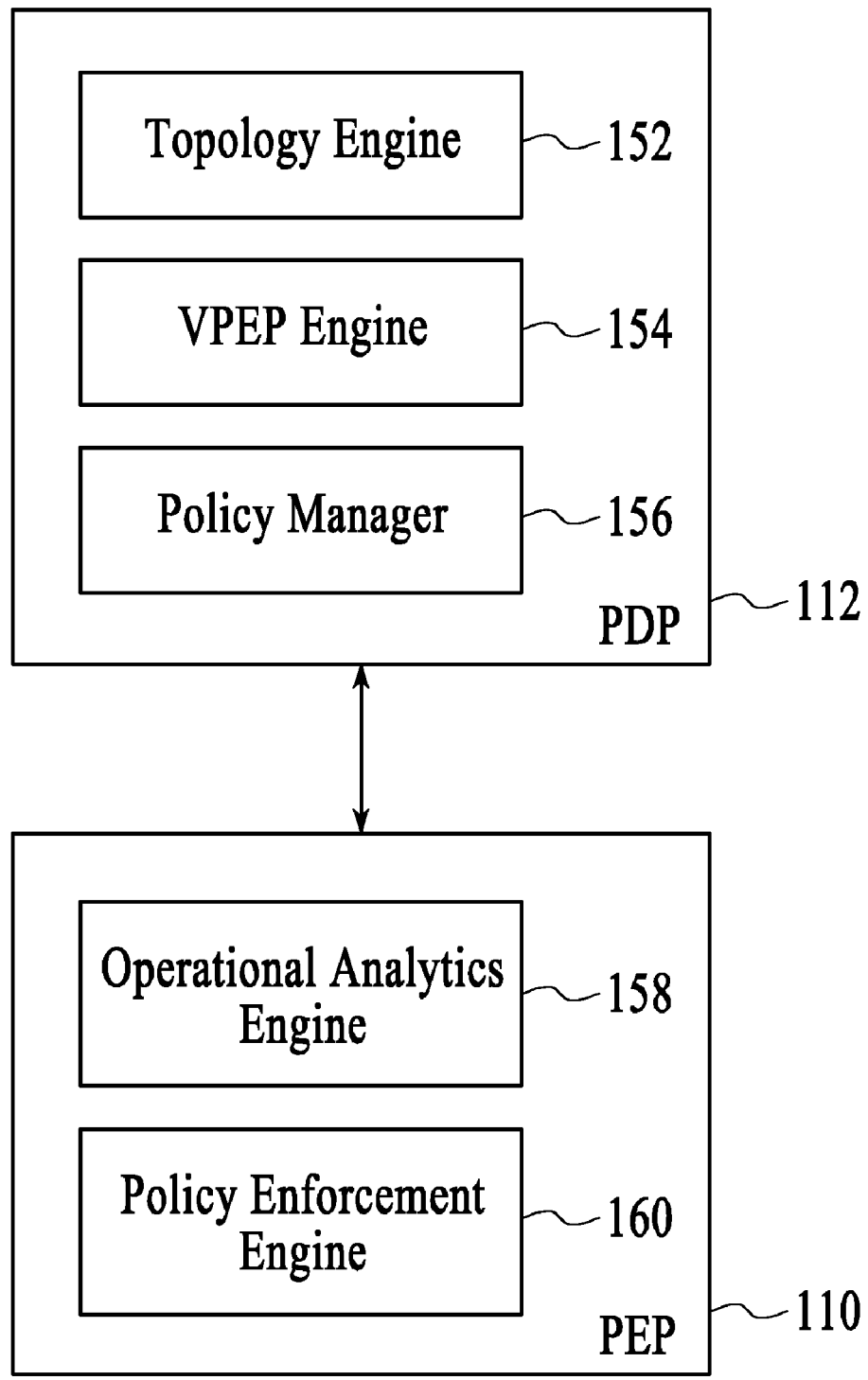
FIG. 4 depicts an embodiment of a Policy Decision Point (PDP) and a Policy Enforcement Point (PEP).

FIG. 4 depicts an embodiment of the PDP 112 and the PEP 110 from FIG. 1. In the embodiment of FIG. 4, the PDP includes a topology engine 152, a VPEP engine 154, and a policy manager 156 and the PEP includes an operational analytics engine 158, and a policy enforcement engine 160.

The topology engine 152 of the PDP 112 is configured to obtain topology information about the wireless communications network 100. In an embodiment, the topology information is learned/discovered and/or provided from an external source. In an embodiment, the topology information is learned from an external source. In another embodiment, topology learning involves learning which IP addresses are currently active in a give Cell ID (i.e., the location of a mobile IP address within the UTRAN).

The VPEP engine 154 of the PDP 112 is configured to support the establishment and management of VPEPs 140. In an embodiment, the VPEP engine maintains a VPEP database that associates a location in the wireless communications network with a traffic policy as indicated in FIG. 2.

The policy manager 156 of the PDP 112 determines which policies are going to be applied to each traffic flow. In an embodiment, policy manager examines the traffic flows to determine if individual traffic flows should be associated with a VPEP. In an embodiment, the VPEP engine 154 uses an origin IP address of a flow to find the corresponding origination Cell ID in the UTRAN. Once the Cell ID is known, the VPEP engine will use the Cell ID to determine which VPEP the flow will pass through and the policy manger will apply the corresponding policy.

The operational analytics engine 158 of the PEP 110 obtains traffic condition information that can be used in policy enforcement. For example, the operational analytics engine can obtain traffic information on the following basis: per interface; per device type; per time of day; per URL or application; per subscriber or group of subscribers; per recurring time period; per traffic type; and per network access type. In an embodiment, the current traffic conditions at an interface are obtained by calculating the difference between a nominal value (e.g., the bandwidth of the interface) and the combined bandwidth of the traffic flows that are currently allocated to the interface.

The policy enforcement engine 160 of the PEP 110 enforces the policies that are associated with the VPEPs. In an embodiment, policy enforcement may include: allowing data to be transmitted to the intended destination, preventing data from being transmitted to the intended destination, preventing data from being transmitted to the intended destination and rerouting the data to a service provider-defined end point that presents the subscriber with some options, and/or throttling or reducing bandwidth throughput.

Although FIG. 4 depicts one embodiment of the PDP 112 and PEP 110, other embodiments of the PDP and PEP are possible. Additionally, the functionality as described above can be mixed between the PDP and the PEP or combined in various different ways while still performing the overall VPEP functionality.

In an embodiment, the PDP 112 and PEP 110 may be integrated with one of the other network elements. For example, the PDP and/or PEP may be located in the same "box" as the SGSN 106, the GGSN 108, and/or the Internet gateway 114. Alternatively, the PDP and the PEP can be standalone network elements, such a distinct network nodes (e.g., different "boxes") that are connected to the network by wired and/or fiber-optic network connections using network communications protocols such as Internet Protocol and Ethernet. Whether the PDP and PEP are physically located in a distinct physical network node or in the same network node as another network element, the combined functionality of the PDP and the PEP is basically the same.

Use of the PEP and PDP as described herein is applicable to different kinds of radio access networks, including, for example, 3GPP, 3GPP2, IEEE 802.16, and 4G radio access networks.

Figure 5:
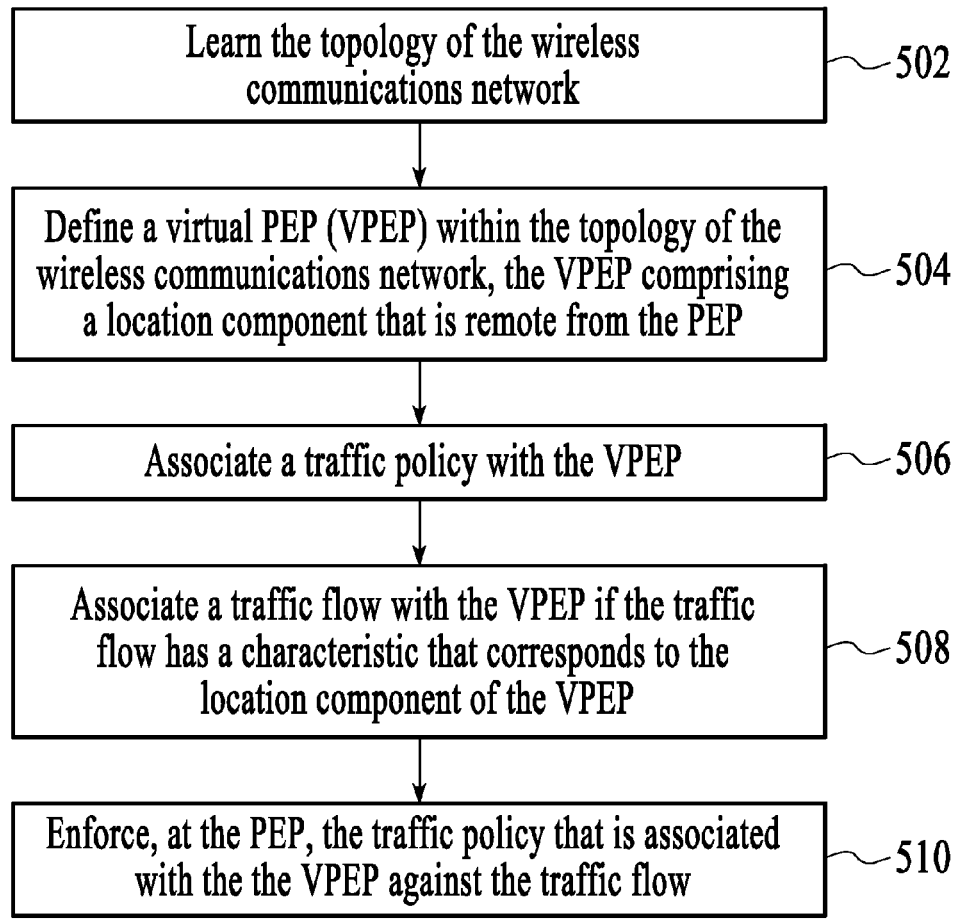
FIG. 5 is a process flow diagram of a method for enforcing a traffic policy at a PEP that controls the flow of traffic in a wireless communication network.

FIG. 5 is a process flow diagram of a method for enforcing a traffic policy at a PEP that controls the flow of traffic in a wireless communication network. At block 502, the topology of the wireless communications network is learned. At block 504, a VPEP is defined within the topology of the wireless communications network, the VPEP comprising a location component that is remote from the PEP. At block 506, a traffic policy is associated with the VPEP. At block 508, a traffic flow is associated with the VPEP if the traffic flow has a characteristic that corresponds to the location component of the VPEP. At block 510, the traffic policy that is associated with the VPEP is enforced against the traffic flow at the PEP.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 6:
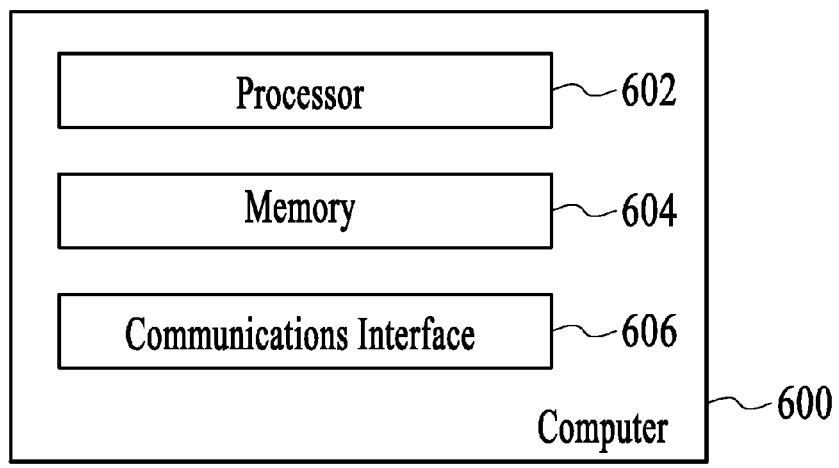
FIG. 6 depicts a computer that includes a processor, memory, and a communications interface.

In an embodiment, the functionality of the PDP and the PEP of FIGS. 1-5 are performed by a computer, such as a router or server, which executes computer readable instructions. FIG. 6 depicts a computer 600 that includes a processor 602, memory 604, and a communications interface 606. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for enforcing a traffic policy at a policy enforcement point (PEP) that controls the flow of traffic in a wireless communications network, the method comprising:
   learning the topology of the wireless communications network;
   defining a virtual PEP (VPEP) within the topology of the wireless communications network, the VPEP comprising a location component that is remote from the PEP;
   associating a traffic policy with the VPEP;
   associating a traffic flow with the VPEP if the traffic flow has a characteristic that corresponds to the location component of the VPEP; and
   enforcing, at the PEP, the traffic policy that is associated with the VPEP against the traffic flow, wherein the traffic flow is associated with the VPEP if the traffic flow passes through a location defined by the location component on its way to a mobile station.

2. The method of claim 1, further comprising obtaining a current traffic condition at the VPEP and enforcing the traffic policy in response to the current traffic condition.

3. The method of claim 1, wherein the location component is an interface in the wireless communications network.

4. The method of claim 3, wherein the traffic flow is associated with the VPEP if the traffic flow passes through the interface on its way to a mobile station.

5. The method of claim 1, wherein the VPEP comprises more than one location component.

6. The method of claim 1, further comprising defining multiple different VPEPs within the topology of the wireless communications network that have different location components.

7. A system for enforcing a traffic policy in a wireless communications network, the system comprising a non-transitory computer readable medium that stores computer executable instructions, which when executed by a processor, implements;
   a policy decision point (PDP) for establishing traffic policies; and
   a policy enforcement point (PEP) for enforcing the traffic policies of the PDP;
     wherein the PDP comprises:
     a virtual PEP (VPEP) engine that is configured to:
       learn the topology of the wireless communication network;
       define a VPEP within the topology of the wireless communication network, the VPEP comprising a location component that is remote from the PEP; and
     a policy manager that is configured to:
       associate a traffic policy with the VPEP; and associate a traffic flow with the VPEP if the traffic flow has a characteristic that corresponds to the location component of the VPEP, wherein the PEP comprises a policy enforcement engine that is configured to enforce the traffic policy that is associated with the VPEP on the traffic flow, wherein the traffic flow is associated with the VPEP if the traffic flow passes through a location defined by the location component on its way to a mobile station.

8. The system of claim 7, wherein the PEP comprises an operational analytics engine to obtain a current traffic condition at the VPEP and wherein the policy enforcement engine enforces the traffic policy in response to the current traffic condition.

9. The system of claim 7, wherein the PEP is implemented in network router.

10. The system of claim 7, wherein the location component is an interface in the wireless communications network.

11. The system of claim 10, wherein the traffic flow is associated with the VPEP if the traffic flow passes through the interface on its way to a mobile station.

12. The system of claim 7, wherein the VPEP comprises more than one location component.

13. The system of claim 7, wherein multiple different VPEPs are defined by the VPEP engine, the different VPEPs having different location components.

14. A method for enforcing a traffic policy at a policy enforcement point (PEP) that controls the flow of traffic in a wireless communications network, the method comprising:
　learning the topology of the wireless communications network;
　defining a virtual PEP (VPEP) within the topology of the wireless communications network, the VPEP comprising a location component that is remote from the PEP;
　associating a traffic policy with the VPEP;
　associating a traffic flow with the VPEP if the traffic flow has a characteristic that corresponds to the location component of the VPEP; and
　enforcing, at the PEP, the traffic policy that is associated with the VPEP against the traffic flow, wherein the location component is an interface in the wireless communications network.

15. The method of claim 14, wherein the traffic flow is associated with the VPEP if the traffic flow passes through the interface on its way to a mobile station.

16. A method for enforcing a traffic policy at a policy enforcement point (PEP) that controls the flow of traffic in a wireless communications network, the method comprising:
　learning the topology of the wireless communications network;
　defining a virtual PEP (VPEP) within the topology of the wireless communications network, the VPEP comprising a location component that is remote from the PEP;
　associating a traffic policy with the VPEP;
　associating a traffic flow with the VPEP if the traffic flow has a characteristic that corresponds to the location component of the VPEP; and
　enforcing, at the PEP, the traffic policy that is associated with the VPEP against the traffic flow, wherein the VPEP comprises more than one location component.

17. A method for enforcing a traffic policy at a policy enforcement point (PEP) that controls the flow of traffic in a wireless communications network, the method comprising:
　learning the topology of the wireless communications network;
　defining a virtual PEP (VPEP) within the topology of the wireless communications network, the VPEP comprising a location component that is remote from the PEP;
　associating a traffic policy with the VPEP;
　associating a traffic flow with the VPEP if the traffic flow has a characteristic that corresponds to the location component of the VPEP; and
　enforcing, at the PEP, the traffic policy that is associated with the VPEP against the traffic flow, further comprising defining multiple different VPEPs within the topology of the wireless communications network that have different location components.

* * * * *